United States Patent
Gandon et al.

(10) Patent No.: US 7,851,045 B2
(45) Date of Patent: Dec. 14, 2010

(54) TRANSPARENT TEXTURED SUBSTRATE AND METHODS FOR OBTAINING SAME

(75) Inventors: Christophe Gandon, Lean d'Angely (FR); Christian Marzolin, Paris (FR); Benoit Rogier, Paris (FR); Eddy Royer, Asnieres Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 797 days.

(21) Appl. No.: 10/312,948

(22) PCT Filed: Jul. 4, 2001

(86) PCT No.: PCT/FR01/02138

§ 371 (c)(1),
(2), (4) Date: Nov. 17, 2003

(87) PCT Pub. No.: WO02/02472

PCT Pub. Date: Jan. 10, 2002

(65) Prior Publication Data

US 2004/0067339 A1    Apr. 8, 2004

(30) Foreign Application Priority Data

Jul. 6, 2000    (FR) .................................. 00 08842

(51) Int. Cl.
B32B 1/00    (2006.01)
(52) U.S. Cl. ....................................... 428/141; 428/156
(58) Field of Classification Search ................. 428/141, 428/156
See application file for complete search history.

(56) References Cited

U.S. PATENT DOCUMENTS

| | | | |
|---|---|---|---|
| 3,354,022 A | 11/1967 | Dettre et al. | |
| 5,242,544 A | 9/1993 | Itoh et al. | |
| 5,361,163 A * | 11/1994 | Matsuda et al. | 359/452 |
| 5,418,039 A | 5/1995 | Carter | |
| 5,575,878 A | 11/1996 | Cox et al. | |
| 5,965,235 A | 10/1999 | McGuire et al. | |
| 6,299,981 B1 * | 10/2001 | Azzopardi et al. | 428/429 |
| 6,352,758 B1 | 3/2002 | Huang et al. | |

FOREIGN PATENT DOCUMENTS

| | | |
|---|---|---|
| EP | 0 629 592 | 12/1994 |
| EP | 0 662 683 | 7/1995 |
| EP | 0 887 179 | 12/1998 |
| EP | 0 952 122 | 10/1999 |
| FR | 2 756 276 | 5/1998 |

(Continued)

Primary Examiner—Alicia Chevalier
(74) Attorney, Agent, or Firm—Oblon, Spivak, McClelland, Maier & Neustadt, L.L.P.

(57) ABSTRACT

The invention concerns a transparent substrate whereof part at least of the outer surface has the form of a web comprising protuberances, 80% of them at least, having heights ranging between 40 and 250 nm, mean diameters between 1 and 500 nm, 80% at least of the distances between two neighbouring protuberances ranging between 1 and 500 nm. The invention further provides two methods for making said substrates and its use in a transport vehicle glazing, for a building, or for an indoor or outdoor decorative element, for urban environment or for household appliance, in a lenticular screen or microprism substrate, in an engraved glass substrate for lamp or display, and in a chemical or biochemical microreactor.

17 Claims, 1 Drawing Sheet

FOREIGN PATENT DOCUMENTS

| | | |
|---|---|---|
| FR | 2 792 628 | 10/2000 |
| GB | 536 048 | 5/1941 |
| JP | 07 206475 | 8/1995 |
| JP | 2000 135755 | 5/2000 |
| WO | 99 24523 | 5/1999 |

\* cited by examiner

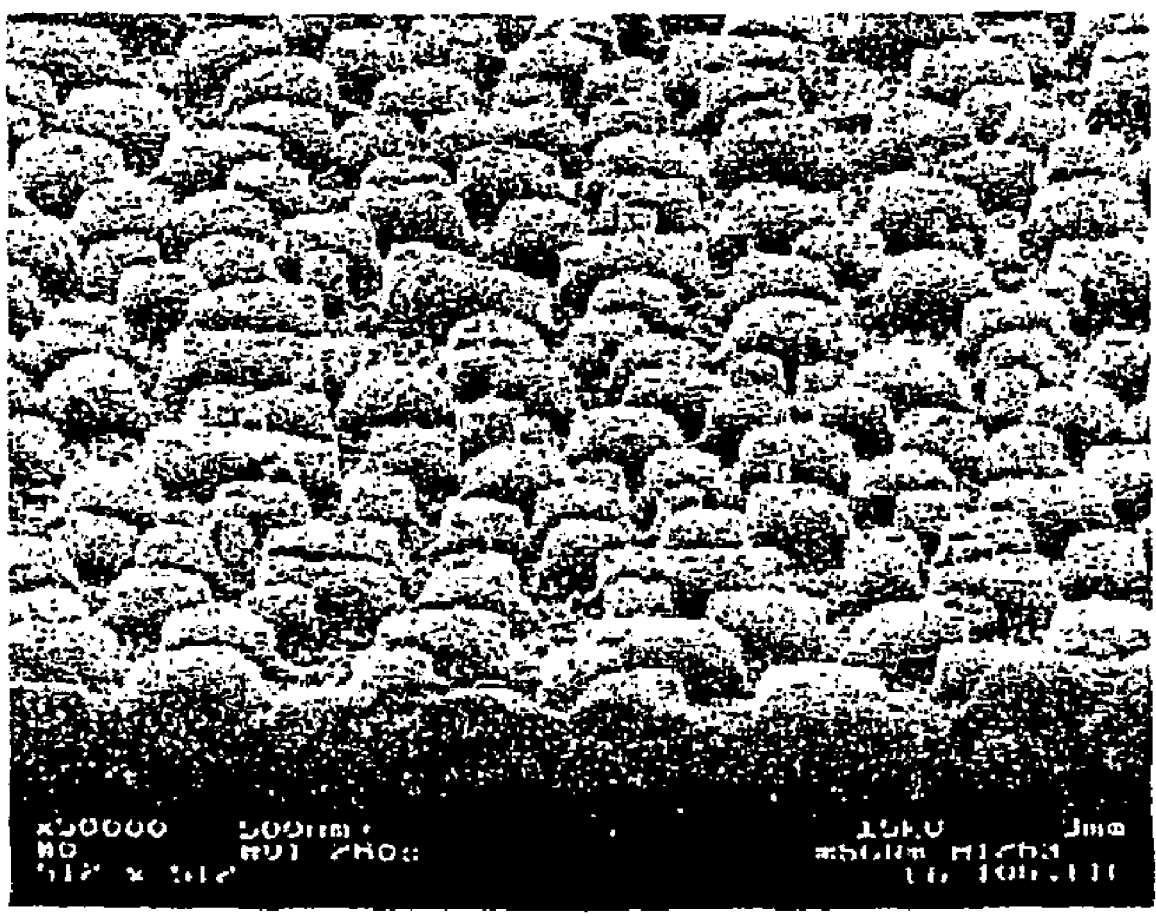
FIGURE

TRANSPARENT TEXTURED SUBSTRATE AND METHODS FOR OBTAINING SAME

BACKGROUND

The present invention relates to a transparent substrate for which there are sought the best optical properties currently required for a glazing, whether it is a glazing for a transportation vehicle or for a building. In addition to having optical properties of the highest quality, this substrate is designed to offer additional properties in the form of modification of the wettability behavior of the substrate to behavior that can be described as superhydrophobic/superoleophobic or superhydrophilic/superoleophilic, in the form of dirt-repelling, antireflective, electrical conduction and antistatic properties.

The hydrophobicity/oleophobicity property of a substrate lies in the fact that the contact angles between a liquid and this substrate are high, for example, on the order of 120° for water. The liquid then has a tendency to flow easily in the form of drops over the substrate, by simple gravity if the substrate is inclined or under the effect of aerodynamic forces in the case of a moving vehicle. This phenomenon is the expression of a rain-repelling effect. During their flow, moreover, the droplets are capable of conveying dust, insects or more or less greasy dirt of all natures, the presence of which would result in an unsightly appearance and possibly even in an impairment of visibility through the substrate. To this extent, the hydrophobic/oleophobic substrate also exhibits a dirt-repelling property.

Known hydrophobic/oleophobic agents are, for example, fluorinated chlorosilanes and fluorinated alkylsilanes such as described in European Patent Application A1 0675087. They are applied in known manner by traditional deposition methods with or without heating.

In contrast, the hydrophilicity/oleophilicity property of a substrate is manifested by small contact angles between a liquid and this substrate, for example, ranging between 0 and 5° and preferably very much smaller than 5° for water on clean glass. This property favors the formation of transparent, thin liquid films, to the detriment of fog or ice, which are composed of miniscule droplets that detract from visibility through a transparent substrate. These antifogging and anti-icing effects observed on a hydrophilic/oleophilic substrate are well known.

Numerous hydrophilic agents, especially hydroxylated substances such as poly(hydroxyalkyl (meth)acrylates), are used in known manner for this purpose in the case of transparent substrates. Moreover, certain photocatalytic compounds, such as $TiO_2$, are used in particular in association with glass substrates, not only for their hydrophilic character after exposure to light, but also for their ability to decompose the dirt of organic origin by a radical oxidation process; the hydrophilic/oleophilic and dirt-repelling properties are then obtained simultaneously. It is known that coatings having a photocatalytic property and comprising $TiO_2$ can be deposited from at least one titanium precursor, in solution as the case may be, by liquid-phase pyrolysis, by a sol-gel technique or else by vapor-phase pyrolysis.

According to the foregoing, the hydrophobicity/oleophobicity property is appraised quantitatively by measuring the contact angle formed in most cases by a drop of water on a given substrate. Unless otherwise indicated, this contact angle is measured for a horizontal substrate. In reality, as already mentioned hereinabove, the purpose of conferring hydrophobicity on a substrate is to influence the dynamic behavior of liquid droplets. This is true not only for substantially vertical static substrates such as the exterior glazings of buildings and glazings for shower stalls but also for glazings for transportation vehicles. In the case of a liquid drop on a substrate inclined relative to the horizontal, there are observed two different contact angles: the advancing angle and the receding angle, determined respectively at the front and rear of the drop relative to the direction of its displacement. These angles are the values reached at the limit of detachment of the drop. The difference between the advancing angle and the receding angle is known as hysteresis. A water drop having large hysteresis or a small receding angle will have difficulty in flowing over a substrate. Thus it is readily understood that effective hydrophobicity is contingent both upon a large advancing angle and small hysteresis. Finally, it is known that the size of the drop influences the advancing and receding angles.

SUMMARY

The invention now provides a transparent substrate capable of intensifying the intrinsic hydrophobic/oleophobic or hydrophilic/oleophilic character of the material of the substrate, which can be obtained under excellent industrial conditions, especially by a continuous process, in all dimensions of glazings demanded and used by the public, and exhibiting optical properties superior to those of current glazings. Depending on the case, this substrate can be superhydrophobic/superoleophobic (characterized, by way of indication, by a minimum advancing angle of 160° and a minimum receding angle of 120° for a water drop) or superhydrophilic/superoleophilic (contact angle smaller than 5°, approaching 0° for water). It can also be made simply hydrophobic/oleophobic or hydrophilic/oleophilic in perfectly controlled manner. Examples of substrates that can be obtained according to the invention are hydrophobic/oleophobic substrates having advancing/receding contact angles with a water drop of 160°/110°, 140°/130°, etc. (angles measured by growth and contraction of a drop on the pipette).

When the substrate is hydrophilic/oleophilic and photocatalytic, the intensification of the hydrophilic/oleophilic character is accompanied by intensification of the dirt-repelling character.

To this end, the object of the invention is a substrate in which at least part of the outer surface has the geometry of a sheet provided with protuberances, at least 80% of which have heights of between 40 and 250 nm as well as mean diameters of between 1 and 500 nm, at least 80% of the distances between two neighboring protuberances ranging between 1 and 500 nm.

Although the transparency of the substrate makes it possible to appraise specific advantages related to its optical qualities, the inventive substrate may also be non-transparent.

The minimum of 80% fixed according to the invention is not absolutely required, and in certain cases this minimum could be less than 80%, for example on the order of 70%. Nevertheless, such a reduction detracts from the optical qualities so that, in reality, almost all of the protuberances, especially at least 90% and preferably at least 95% of the protuberances, will satisfy the required criteria.

The invention therefore makes it possible, by means of a process that is industrially advantageous in many regards, as we shall see hereinafter, to obtain a superhydrophobic/superoleophobic or superhydrophilic/superoleophilic transparent substrate for all shapes and sizes of currently demanded glazings, with the best optical qualities required for glazings. In addition, substrates produced according to the invention have exhibited remarkable durability as well as resistance to abrasion and erosion.

Furthermore, it is possible by virtue of the invention to confer additional functions such as antireflective, electrical conduction and antistatic properties on the substrate, using an also entirely advantageous manufacturing process.

According to other characteristics of the invention:
- at least 80% of the protuberances have heights at least equal to 60 nm, in particular at least equal to 80 nm;
- at least 80% of the protuberances have heights at most equal to 190 nm, in particular at most equal to 170 nm;
- at least 80% of the protuberances are substantially cones or right frustums of cones with axes perpendicular to the principal plane of the substrate and with half-angles at the apex ranging between 0 and 60°, in particular between 0 and 30°, this definition also referring to cylinders in the borderline case;
- at least 80% of the protuberances have mean diameters of 40 to 380 nm, where this mean diameter can be considered, for example, to be that of the frustum of the cone at half height.

Of course, numerous protuberances according to the invention have geometries that differ to a greater or lesser degree from those of a cone, frustum of a cone or cylinder, and that represent merely approximations of frequently obtained shapes. Also worthy of mention are protuberances in the form of columns perpendicular to the principal plane of the substrate, with cross sections that are regular or irregular but are defined by two orthogonal axes, one of larger and one of smaller dimensions, both falling within the range of 1 to 500 nm, or in other words the range of mean diameters defined according to the invention. The ratio of the said larger to the said smaller dimension is advantageously between 1 and 4.

Also part of the invention are substrates whose protuberances, having cross sections that in general differ from one another, comprise protuberances with cross sections having a partly concave periphery.

The invention also encompasses substrates in which the protuberances having the aforesaid geometries were formed as negative or in other words hollow structures. In this regard we cite cavities with diameters of between 0.1 and 500 nm in the case of a substrate to be used as a chemical or biochemical microreactor.

BRIEF DESCRIPTION OF THE FIGURE

Exemplary embodiments of the present invention are described herein with reference to the following FIGURE, wherein:

FIGURE is an SEM micrograph of an exemplary substrate according to the present invention.

DETAILED DESCRIPTION OF EXEMPLARY EMBODIMENTS

According to preferred embodiments, the required geometry of at least part of the outer surface of the substrate is provided by a layer of a material containing one or more oxidation or nitridation products such as $SiO_2$, $Si_3N_4$, AlN, $Al_2O_3$, $SnO_2$ and $ZnO_x$ with x>0, and/or formed by a vacuum technique, especially by magnetic-field-assisted cathodic sputtering, plasma magnetron, plasma CVD, atmospheric CVD, powder and liquid pyrolysis, by a polymerization and/or crosslinking process, or by a technique of the sol-gel type.

These compounds and processes are in fact well adapted to the formation of the starting layer in which there are formed the protuberances defined hereinabove, with a view to obtaining a product of high optical quality.

This layer imparting the desired geometry to the outer surface of the substrate can itself be the outer layer or can be covered by a coating that virtually does not modify the surface geometry, such as a functional, hydrophobic or other coating, which is monomolecular and has a thickness of a few nanometers. The inventive substrate can be composed exclusively of this layer, provided as the case may be with the monomolecular layer, or of this layer laminated with an underlying sheet of glass or of transparent plastic material, possibly with interposition of an electrically conductive layer. There can be used a soda-lime glass, especially a float glass such as used for transportation vehicles, for buildings or for other plate-glass applications, or a glass of the bottle or flask type, a borosilicate of the pyrex type, a phosphate glass usable as a prosthesis or optical glass, a lead glass (crystal), an aluminosilicate such as a glass ceramic, or a silica-free amorphous solid material. All transparent plastic materials are suitable, including polyvinylbutyral, polyurethane, polycarbonate, polymethyl methacrylate, ionomeric resin, etc., provided they are compatible with the operating conditions (temperature, pressure, etc.) of the successive stages of formation of the substrate. In addition, a plurality of sheets of glass and/or of plastic material can be laminated in the inventive substrate: for example, two glass sheets bonded to one another by an adhesive interlayer of polyvinylbutyral, one glass sheet and one polyurethane sheet with energy-absorbing properties, etc.

The merit of interposing an electrically conductive layer between the sheet of glass or plastic material and the layer containing the protuberances is explained hereinafter in regard to one of the methods for manufacture of the inventive substrate. Examples of this electrically conductive layer include the substoichiometric and/or doped metal oxides known from French Patent Application 2695117, in particular indium oxide doped with tin (ITO), zinc oxide doped with indium (ZnO:In), with fluorine (ZnO:F), with aluminum (ZnO:Al) or with tin (ZnO:Sn), and tin oxide doped with fluorine ($SnO_2$:F) or with tetravalent or pentavalent antimony ($SnO_2$:Sb). In addition to their electrically conductive properties, these materials are described as having infrared-reflecting and especially low-emissivity properties.

In this regard, any known combination of functional layers of the low-emissivity, antisolar, antireflective, decorative (acid-frosted, screen-printed, lacquered, enameled, textured by calendaring between rollers or by other equivalent processes) type with the substrate in a monolithic or laminated glazing is included in the invention. As examples there are cited:
- a reflective layer deposited on a sheet of PET, which itself is embedded in the adhesive PVB interlayer in a laminated windshield,
- a multiple or laminated glazing containing a thin solar-control layer (for example, of the type sold by SAINT GOBAIN GLASS under one of the brands STARELIO, COOL-LITE) on face 2 and a substrate with the inventive protuberances on the inner face of the multiple glazing, in contact with the atmosphere of the protected enclosure,
- or else a double glazing whose sheet of outer glass is a clear plate glass sold under the brand PLANILUX by SAINT GOBAIN GLASS, and which has an outer face with protuberances according to the invention and an inner face, facing the air space, provided with a thin layer of $SnO_2$:F deposited by CVD (product sold under the brands EKO and EKO PLUS by SAINT-GOBAIN GLASS) or with a layer of silver deposited by cathodic sputtering under vacuum (product sold by SAINT- GOBAIN GLASS under the brand PLANITHERM), each of these layers being highly reflective in the long-wavelength infrared radiation region (low emissivity), thus greatly reducing heat losses and conferring on the double glazing unit greater thermal insulation in combination with high light transmission, textured layer (face 1)/Planilux/antisolar layer: COOL-LITE, STARELIO (face 2), textured layer (face 1)/Planilux/rare gas filling/low-emissivity layer of $SnO_2$:F (EKO) or of silver (PLANITHERM) (face 3)/Planilux/textured layer/Planilux/reflective layers (mirror: the substrate is still transparent, it is the layer that is reflective), texturing/glass/screen printing (SERALIT, registered trademark of SAINT-GOBAIN GLASS).

The inventive substrate is capable of achieving remarkable optical quality.

Thus, it advantageously has light transmission equal to at least 80%, in particular equal to at least 85%, very particularly equal to at least 90%, and haze equal to at most 5%, in particular equal to at most 2% and very particularly equal to at most 1%.

According to one of the main versions of the invention, the substrate is hydrophobic/oleophobic. As is known, the creation of irregularities on a surface enhances its hydrophobic or hydrophilic character. As indicated hereinabove, this hydrophobic character can be controlled by appropriate choice of the geometry of the protuberances. As an example, a plane surface characterized by advancing/receding angles of 100°/80° can be transformed to a surface containing protuberances and having angles of 160°/120°.

In this case, the substrate is composed, at its outer surface, at least partly of:

a) compounds obtained in particular by a vacuum technique, by evaporation, sputtering, sol-gel, CVD or similar technique;

b) silicones; and/or c) compounds of the formulas:

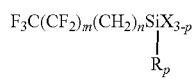

$$F_3C(CF_2)_m(CH_2)_n SiX_{3-p} \atop R_p \qquad (I)$$

and $R_{p'}SiX_{4-p'}$ (II)

in which:
m=0 to 15;
n=1 to 5;
p=0, 1 or 2;
R is a straight-chain or branched alkyl group or a hydrogen atom;
X is a hydrolysable group such as a halo, alkoxy, acetoxy, acyloxy, amino or NCO group;
p'=0, 1, 2 or 3.

The production techniques mentioned hereinabove are advantageous in that they permit incorporation of the hydrophobic compounds into a layer that would not be hydrophobic without such incorporation. For this purpose there can therefore be used an additional precursor in view of obtaining an organic/inorganic composite. It is also entirely possible, however, to use only a single precursor capable of conferring the property of hydrophobicity.

As an example, there can be cited the use of a process of the plasma CVD type, starting from at least one precursor chosen from among:

a silane such as tetramethylsilane or hexamethyldisilane,
an alkoxysilane such as an alkoxytrialkylsilane in which the alkyl group is a methyl, ethyl, propyl or isopropyl group, the methyl group being preferred;
a fluorinated silane, especially a perfluoroalkylalkyltrialkoxysilane or a perfluoroalkylalkyltrihalosilane;
a siloxane such as hexamethyldisiloxane;
a silazane such as hexamethyldisilazane.

By using hexamethyldisiloxane, for example, there is obtained a layer with a plane surface, or in other words before formation of protuberances, the static contact angle for a water drop being 105°.

This outer surface of the substrate, composed at least in part of one or more of the aforesaid compounds, comprises either the layer imparting the required geometry with protuberances described previously or a coating applied on this layer, in a thickness sufficiently fine that it does not substantially modify the geometry thereof. As mentioned hereinabove, this coating can be a grafted monomolecular film.

According to another version, the substrate is hydrophilic/oleophilic by the fact that it contains an appropriate agent. As hydrophilic/oleophilic agent there can be cited, as final product or precursor, the free poly(meth)acrylic acids or their at least partial salts with sodium, potassium, cesium, etc., nonionic surfactants, cellulose esters such as hydroxypropylcellulose, chitosan and chitin derivatives, polymethacrylates, poly(vinyl alcohols) and poly(vinyl acetate), polypyrrole, polyaniline, polyacrylamide, poly(N,N-dimethylacrylamide), poly(N-isopropylacrylamide), polyethylene glycol, polypropylene glycol, polyoxyethylene with terminal hydroxy or methoxy functions, polyallylamine hydrochloride, polysaccharide, dextrans (branched), pullulan (linear polysaccharide), polystyrenecarboxylic acid and salts thereof, polystyrenesulfonic acid, sodium polystyrenesulfonate, polyvinylbutyral, poly(2-vinyl-N-methylpyridinium iodide), poly(4-vinyl-N-methylpyridinium iodide), poly(2-vinylpyridine), poly(2-vinylpyridinium bromide), polyvinylpyrrolidone, copolymers obtained from starting monomers of different aforesaid polymers, and especially sequenced copolymers, certain titanium compounds, such as titanium tetraisopropyl or titanium tetraisobutyl, stabilized if necessary, for example by acetylacetonate, titanium tetrachloride, etc.

Just as the hydrophobic/oleophobic agents, the hydrophilic/oleophilic agents can be incorporated in particular in the layer containing the protuberances itself, or can be applied on this layer as a fine film.

Since the properties of hydrophobicity and hydrophilicity are contrary to one another, the inventive substrate generally contains only one or more hydrophobic/oleophobic agents or only one or more hydrophilic/oleophilic agents. Nevertheless, the invention permits the coexistence of both types of agents, especially in a version in which the outer surface of the substrate contains hydrophobic protuberances and a low level between the protuberances which is hydrophilic (it will be understood hereinafter how the process for manufacture of the inventive substrate permits easy production of such a product). In this version, the major part of a liquid coming into contact with the substrate flows over the hydrophobic protuberances, and only a minute part of this liquid comes into contact with the hydrophilic low level, where it forms a transparent uniform film.

Advantageously, the inventive substrate has dirt-repelling properties. These can result partly, as has been seen hereinabove, from (super)hydrophobic/(super)oleophobic or (super)hydrophilic/(super)oleophilic properties. These properties can also be related directly to the nature of certain constituents of the substrate. Thus, as already mentioned, certain titanium compounds such as $TiO_2$ are among the hydrophilic/oleophilic agents that are capable of decomposing the organic residues by a photocatalytic reaction.

The invention achieves a noteworthy advance in the control of evacuation of liquids on the substrate, the suppression of droplets, fog and ice formed from the residual liquid, or in other words the liquid that has not been evacuated, and the decomposition of dirt contained in this residual liquid, so that the substrate can be kept clean without any cleaning operations.

According to a preferred embodiment, the inventive substrate has antireflective properties. In the traditional approach, an antireflective substrate is obtained by combining a first thin layer of relatively low refractive index as the outer layer, that is in contact with the atmosphere, with a second thin layer of higher refractive index immediately under the first, and then if necessary with other layers of alternatively low and high indices. According to the present invention, the provision of protuberances makes it possible to control the solid fraction relative to the air fraction. Thus, in the corresponding thickness of the substrate, the refractive index is a function of the index of the material and of the index of the air, the latter equal to 1, that is, the minimal value. This resultant index is lower than that which would be found for a solid layer of the same material, and it can be lowered to the extent that it tends to 1, by reducing the solid fraction in controlled manner.

An antireflective effect therefore results from the fact that the outer layer contains an external fraction corresponding to the protuberances and a solid internal fraction. According to another version, the outer layer does not contain such a solid internal fraction. Alternatively, or in complementary manner, the antireflective properties can result from a treatment in the form of a stack of thin interference layers, generally composed of alternating layers based on dielectric materials with high and low refractive indices, or in the form of a layer having a refractive index gradient in its thickness, as described in European Patent 1013622. Such a coating deposited on a transparent substrate has the function of reducing the light reflection and therefore of increasing the light transmission of the substrate. It is emphasized that such stacks or layers can be formed in particular by vacuum techniques such as plasma CVD, CVD without plasma assistance, cathodic sputtering assisted in particular by a magnetic field, and reactive sputtering, or in other words by techniques that can be easily integrated into a continuous process together with the techniques for formation of protuberances, to be explained hereinafter.

On the outer face of an automobile windshield, the antireflective effect therefore leads to improvement of the visual comfort of the driver and passengers.

According to an advantageous embodiment, the substrate is an electrical conductor. This can be the case of a constituent layer of the substrate, which may or may not be in contact with the ambient atmosphere, or of the entirety of the substrate. Examples of materials used include the substoichiometric and/or doped metal oxides cited previously. The ability of the substrate to conduct electricity relates here to the antistatic function, or in other words the capacity to dissipate electrostatic charges and to prevent local accumulation thereof, as well as to the production of heating films, especially for defogging and deicing of glazings. Other usable electrically conductive materials include a material containing, for example, $SiH_4$ or $CH_4$ as precursor in order to form metal bonds of the Si—Si or C—C type, or metal salts such as copper acetylacetonate. The merit in preventing local accumulations of electrostatic charges is evident in applications such as aircraft windshields, where on the contrary it is important to evacuate these charges by conduction. In fact, accumulations of charges would constitute a source of potential crazing and destruction of possible stacked functional layers as well as of the very structure of the substrate, especially when it is laminated.

Another object of the invention resides in a process for etching of a layer, of a glass, of silica (quartz) or of a polymeric substrate by a reactive plasma, via a mask of appropriate material and dimensions, so as to form thereon protuberances such as defined hereinabove.

In fact, it has been surprisingly found, although the reasons are not yet well known, that etching virtually did not take place in the absence of a mask, in the case in which glass is the material to be etched.

In addition to the advantages gained by this process due to the fact that the products obtained have qualities such as superhydrophobicity, superhydrophilicity, optical properties in the case of a transparent substrate, and durability over large surface areas, this process seems to be currently promising, since it can be achieved by techniques, especially vacuum techniques, which make it possible to perform, continuously and by means of a single apparatus, the treatments of the substrate with a view in particular to providing it with increasingly more numerous functions required for glazings. An adequate etching method is reactive ion etching.

The layer to be etched (to be understood hereinafter as the layer, the glass, the silica or the polymer substrate to be etched) may or may not be transparent; in the latter case it may be subsequently transformed, in certain cases, to a transparent layer (for example by oxidation of Ti or Al to transparent $TiO_2$ or $Al_2O_3$).

According to advantageous characteristics of the process:
- the mask is composed of an electrically conductive material such as a metal, especially a noble metal such as Au, Ag, Pt or Pd, a metal alloy, a conductive oxide such as obtained by doping, especially $SnO_2$:F, $SnO_2$:In and similar oxides, a ceramic or a polymer;
- the mask is used in contact with the layer to be etched; we mention in this regard a method of the inkjet type for formation of the mask, among numerous other possibilities;
- alternatively, the mask is used without contact with the layer to be etched;
- the mask can consist, for example, of a metal screen positioned parallel to and at a short distance from this layer;
- the said mask is used in a condition in which it is supported by a sheet, especially of plastic, which is particularly practical since the mask is obtained in particular from a product in the form of rolls; in this embodiment, good results can be obtained whether the mask is situated on the face of the said sheet oriented toward the layer to be etched, or on its other face.

To obtain the inventive substrate by this process, etching is performed anisotropically and oriented along the normal to the substrate. To achieve this, five alternatives are recommended.

According to the first, the layer to be etched is laminated with an underlying electrically conductive layer, which is polarized with a radiofrequency generator during etching. The nature of the electrically conductive layer has been described hereinabove.

According to the second alternative, the substrate is placed on an electrically conductive support connected to a radiofrequency generator during etching.

According to the other three alternatives:

the layer to be etched is itself electrically conductive; as an example, it can be $SnO_2$:F or a metal layer such as Ti or Al, which possibly will be oxidized to transparent $TiO_2$ or $Al_2O_3$ after etching;

the layer to be etched is laminated with a sheet of electrically conductive glass;

the layer to be etched is laminated with a sheet of glass provided on its opposite face with an electrically conductive layer such as $SnO_2$:F.

According to other characteristics of the process:

one or more plasmagenic gases such as $CF_4$, $C_3F_2$, $SF_6$, $C_2F_4$ or $CHF_3$ is or are used to perform etching;

the mask is composed of nodules containing at least one of the elements Ag, Au, Pd, Pt, Cu, Al, Zn, Sn, Sb, Ti, Zr, W, Mb, Ta, Ir. A layer of one or more of these elements is easily subjected to dewetting in order to obtain the nodules under excellent reproducibility conditions, in the required dimensions, which are comparable to or smaller than the wavelengths of visible light in order to minimize haze, over relatively large surface areas (such as larger than 1 $m^2$) and with a high production speed;

the process includes a step in which the fraction of the said mask composed of nodules remaining after completion of etching is eliminated or transformed to transparent compounds. It is pointed out that, since the metal nodules can also be attacked during etching, sometimes nothing of them remains at the end of etching. In the case of Ag nodules, for example, one elimination process can be to immerse the etched substrates in a solution of aqueous acid such as $HNO_3$. Another conceivable option is mechanical elimination, especially by means of a brush. An example of transformation to transparent compounds is the oxidation of Al to $Al_2O_3$ by passage of a flame over the etched substrate;

the process includes a step in which a coating is formed on the substrate after completion of etching, after which, as the case may be, the fraction of the said mask remaining after completion of etching is eliminated or transformed. An example of this technique is the vacuum grafting of a monomolecular layer of a hydrophobic or hydrophilic agent.

According to a second process for manufacture of the transparent substrate described previously, nodules are formed in the dimensions and geometry required for the said protuberances and then are made transparent if necessary, and a coating is formed by, for example, vacuum grafting of a functional monomolecular layer.

Yet another object of the invention is a glazing containing the substrate described previously, this glazing being intended for a ground, seagoing or airborne transportation vehicle, in particular for a motor vehicle, for a building (window, door, element of sanitary furnishings or other element such as shower stall, table, shelf, etc.), for an element of interior decoration such as an aquarium or of exterior decoration, for street furniture (bus shelter, etc.), or for electrical appliances (oven door, refrigerator shelf, etc.). Besides framing or mounting elements, such a glazing can be substantially composed of a substrate according to the invention or can be provided with one or more of such substrates combined with one or more sheets of glass or of plastic or with transparent structures laminated to a multiple glazing in which all the components are separated in pairs by an air space or the like.

Other objects and applications of the invention are:

a lenticular screen or a microprism-containing substrate obtained according to one of the processes described hereinabove and containing surface irregularities whose dimensions in the principal plane lie within the range of 1 µm to 1 mm; we mention protuberant regular and jointed rows with a height of 8 to 14 µm and a spacing of 300 to 400 µm (peak-to-peak distance between two neighboring rows), formed with a view to obtaining a three-dimensional display system;

an etched glass substrate for a lamp or display unit, obtained according to one of the processes described hereinabove and containing surface irregularities whose dimensions in the principal plane lie within the range of 0.1 µm to 110 m;

the application of a substrate according to the invention and containing cavities with diameters of between 0.1 and 500 nm as chemical or biochemical reactors.

The invention now is described with reference to a practical example.

EXAMPLE 1

A sheet of clear float glass of 0.7 mm thickness, sold under the trade name "Planilux" by SAINT-GOBAIN GLASS of France, was provided with a coating of tin-doped indium oxide (ITO) of 110 nm thickness by any deposition technique known for this purpose, and then with a layer of $SiO_2$ of 100 nm thickness by any appropriate technique (plasma magnetron, pyrolysis, plasma CVD, sol-gel, etc.).

An Ag layer of 15 nm thickness was deposited under vacuum by magnetron sputtering. This Ag layer was then dewetted by heat treatment at 300° C. under a vacuum of 9 mtorr for 30 min. As a result, Ag nodules formed on the $SiO_2$ layer.

The substrate obtained in this way was subjected to reactive ion etching under the following operating conditions. The cathode was supplied with direct current, the ITO conductive underlayer being polarized by connection to a radiofrequency generator regulated at 13.56 MHz. $SF_6$ at a pressure of 75 mtorr was used as plasmagenic gas. The power was 0.106 W/$cm^2$ and the duration of treatment was 250 s.

The fraction of Ag nodules that had not been attacked in the preceding etching step was eliminated by immersion for one night in a 1 molar aqueous $HNO_3$ solution at room temperature.

The attached single FIGURE shows the obtained substrate, viewed at an angle of 15° under a magnification of 50,000 in the scanning electron microscope. There is observed the formation of protuberances, at least 80% of which have heights of between 70 and 200 nm as well as mean diameters of between 50 and 400 nm, at least 80% of the distances between two neighboring protuberances ranging between 1 and 500 nm. These protuberances can be defined as right frustums of cones, with axes perpendicular to the principal plane of the substrate and small half angles, smaller than 20°, at the apex.

A monolayer of perfluorooctylethyltrichlorosilane, $C_{10}F_{17}H_4SiCl_3$, was grafted under vacuum in vapor phase onto this substrate.

The advancing and receding angles measured by growth and contraction respectively of a water drop by means of a pipette were respectively 165° and 122°, corresponding to superhydrophobic behavior.

In addition, there were measured a light transmission of 92.8% and haze of less than 4% by means of a Hazegard XL 211 instrument.

EXAMPLE 2

A glass sheet differing from that of the preceding example by the fact that it did not contain either an ITO coating or an SiO$_2$ layer was subjected to the same dewetting of silver as in the foregoing, and then to the subsequent operations described in the preceding example, while being simply placed on an electrically conductive support connected to the same radiofrequency generator, all other conditions being equal.

Almost all of the cylindrical protuberances formed (axes perpendicular to the plane of the sheet) were characterized by a height of about 100 nm, a diameter of 80 to 100 nm and a distance between the axes of two neighboring cylinders of between 130 and 150 nm.

The etching rate measured perpendicular to the surface of the substrate was 5 to 8 nm/min; in the absence of the mask composed of the silver nodules, this rate was zero.

Thus the invention makes it possible to combine, for a large-size substrate, surface-tension functionality, remarkable optical quality and the possibility of introducing additional functions, under excellent conditions of industrial operation, especially in many cases by performing the different treatments continuously in a single apparatus.

The invention claimed is:

1. A substrate, comprising:
   a layer comprising a material selected from the group consisting of glass, silica and a polymeric material, wherein:
   at least a portion of an outer surface of the layer has a geometry of a sheet provided with irregular protuberances having substantially flat tops;
   at least 80% of the protuberances have heights of between 40 and 250 nm and mean diameters of between 1 and 500 nm;
   at least 80% of adjacent protuberances are separated by a distance of between 1 and 500 nm; and
   the protuberances are obtained by etching a precursor layer through a mask.

2. The substrate according to claim 1, wherein at least 80% of the protuberances have heights of at least 60 nm.

3. The substrate according to claim 1, wherein at least 80% of the protuberances have heights 190 nm or less.

4. The substrate according to claim 1, wherein at least 80% of the protuberances are substantially right frustums of cones having axes perpendicular to a principal plane of the substrate and having half-angles at apex of between 0 and 60°.

5. The substrate according to claim 1, wherein at least 80% of the protuberances have mean diameters of from 40 to 380 nm.

6. The substrate according to claim 1, wherein the protuberances comprise at least one member selected from the group consisting of: a layer of a material containing one or more oxidation or nitridation products, a layer formed by magnetic-field-assisted cathodic sputtering, a layer formed by plasma magnetron, a layer formed by plasma CVD, a layer formed by atmospheric CVD, a layer formed by powder and liquid pyrolysis, a layer formed by a polymerization process, a layer formed by a cross-linking process, a layer formed by a sol-gel type technique.

7. The substrate according to claim 1, wherein:
   a light transmission of the substrate is at least 80%; and
   a haze of the substrate is 5% or less.

8. The substrate according to claim 1, wherein the substrate is hydrophobic/oleophobic.

9. The substrate according to claim 8, wherein the substrate comprises, at its outer surface, at least one member selected from the group consisting of:
   a) compounds obtained in particular by a vacuum technique, by evaporation, sputtering, sol-gel, CVD or similar technique;
   b) silicones; and
   c) compounds of the formulas (I) and (II):

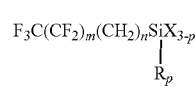
(I)

(II)

in which:
m=0 to 15;
n=1 to 5;
p=0, 1 or 2;
R is a straight-chain or branched alkyl group or a hydrogen atom;
X is a hydrolysable. group such as a halo, alkoxy, acetoxy, acyloxy, amino or NCO group; and
p'=0, 1, 2 or 3.

10. The substrate according to claim 1, wherein the substrate is hydrophilic/olephilic.

11. The substrate according to claim 1, wherein the substrate has dirt-repelling properties.

12. The substrate according to claim 1, wherein the substrate has antireflective properties.

13. The substrate according to claim 1, wherein the substrate is electrically conductive.

14. A glazing for a ground transportation vehicle, a seagoing transportation vehicle, an airborne transportation vehicle, a building, an element of interior decoration, an element of exterior decoration, street furniture or electrical appliances, comprising:
   the substrate according to claim 1.

15. A reactor, comprising the substrate according to claim 1, wherein:
   the substrate includes cavities having diameters of between 0.1 and 500 nm, and
   the reactor is a chemical reactor or a biochemical reactor.

16. A substrate, comprising:
   a layer comprising a material selected from the group consisting of glass, silica and a polymeric material, wherein:
   at least a portion of an outer surface of the layer has a geometry of a sheet provided with irregular protuberances;
   at least 80% of the protuberances have heights of between 40 and 250 nm and mean diameters of between 1 and 500 nm;
   at least 80% of adjacent protuberances are separated by a distance of between 1 and 500 nm;
   the protuberances are obtained by etching a precursor layer through a mask; and
   the protuberances have at least one shape selected from the group consisting of frustums of cones, cylinders, and columns.

17. The substrate of claim 16, wherein:
   a drop of water deposited on the substrate has a advancing angle of at least 160° and a receding angle of at least 120°; and
   a difference between the advancing angle and the receding angle is less than 43°.

* * * * *